C. B. CLARK.
FERTILIZER DISTRIBUTER AND PLANTER.
APPLICATION FILED OCT. 23, 1908.
1,027,593.
Patented May 28, 1912.
3 SHEETS—SHEET 1.
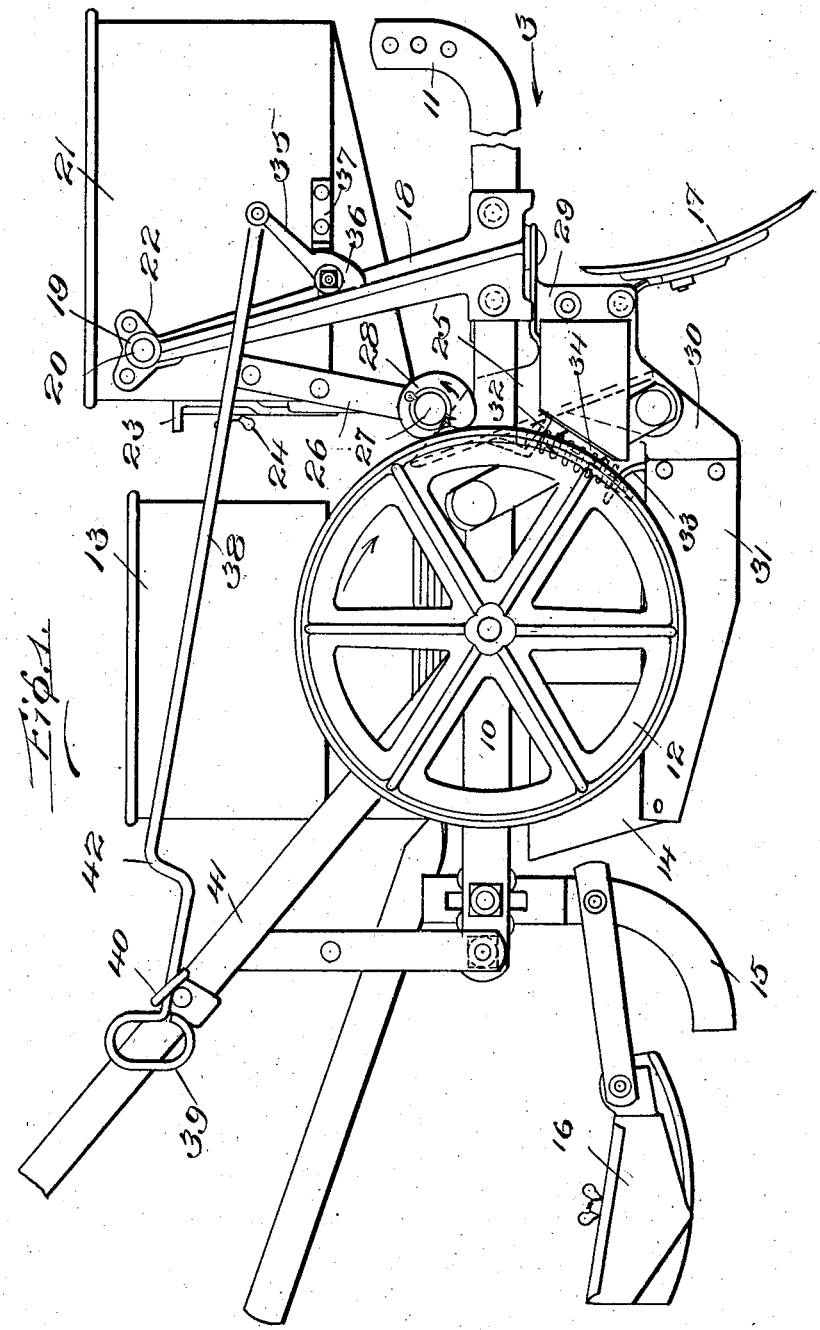
Witnesses
Inventor
Cyril B. Clark
Attorneys

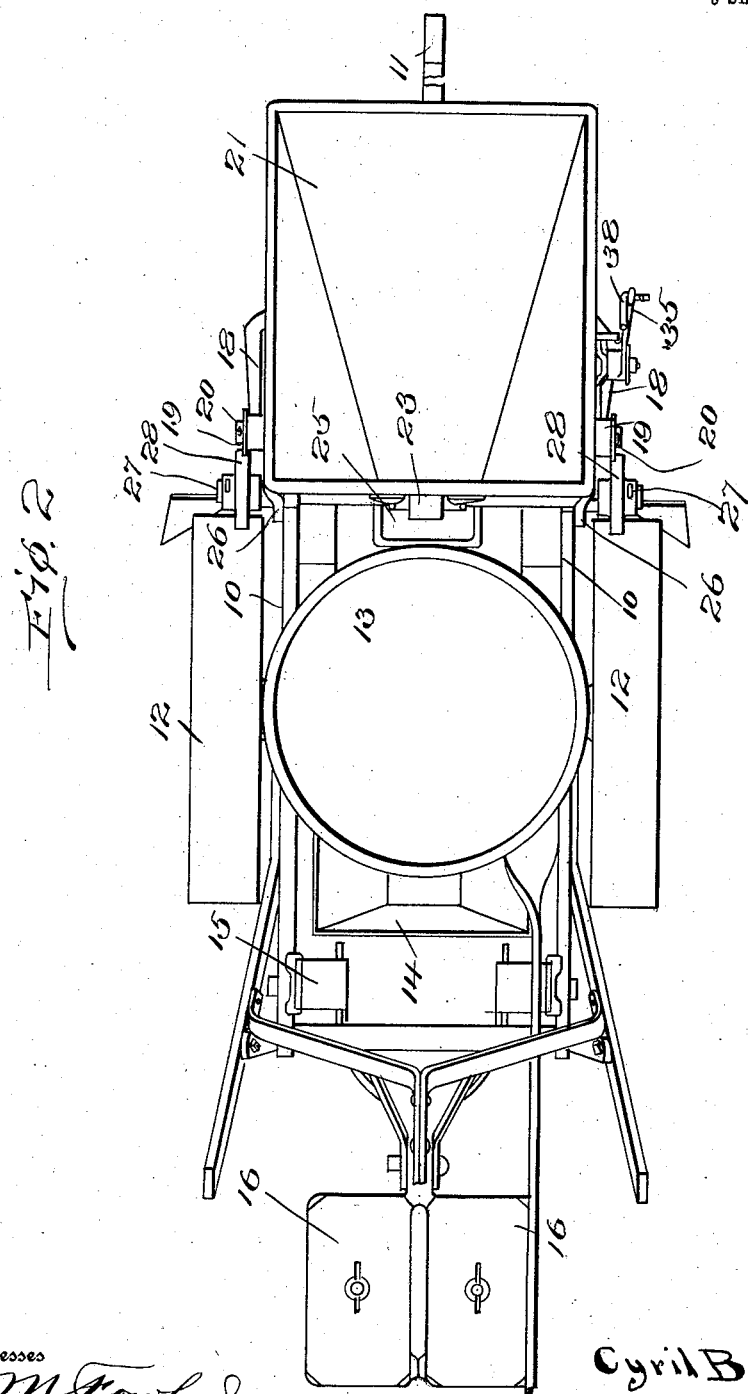

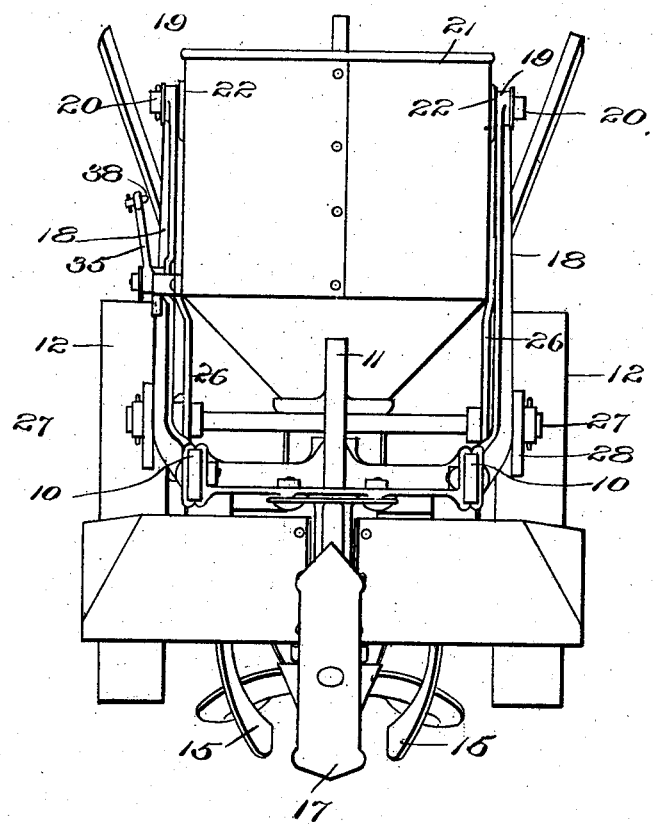

UNITED STATES PATENT OFFICE.

CYRIL B. CLARK, OF NEW ALBANY, INDIANA, ASSIGNOR TO B. F. AVERY & SONS, OF LOUISVILLE, KENTUCKY, A CORPORATION OF KENTUCKY.

FERTILIZER-DISTRIBUTER AND PLANTER.

1,027,593.  Specification of Letters Patent.  Patented May 28, 1912.

Application filed October 23, 1908. Serial No. 459,274.

*To all whom it may concern:*

Be it known that I, CYRIL B. CLARK, a citizen of the United States, residing at New Albany, in the county of Floyd and State of Indiana, have invented certain new and useful Improvements in Fertilizer-Distributers and Planters; and I do hereby declare the following to be a full, clear, and exact description of the invention, such as will enable others skilled in the art to which it appertains to make and use the same.

This invention relates to means for distributing fertilizer etc. and particularly to that type thereof in which the distributer is given vibratory motion for the purpose of shaking the matter therefrom.

The most important object of the present invention is to provide machines of the class stated with a new, effective and greatly simplified means for giving shaking or vibratory movement to the part containing the matter to be distributed, from the periphery of the ground-engaging wheel. This object is well accomplished by interposing between the periphery of the ground-engaging wheel and the distributing receptacle a journaled cam which is carried by the receptacle and directly engages the periphery of said wheel. It further is well accomplished by providing between a suitably mounted receptacle and the ground-engaging wheel a support for said receptacle which is rotatively engaged with the periphery of said wheel and has a shoulder whereby it is adapted to effect abrupt changes in the position of the receptacle, the latter falling suddenly at each rotation of the support, by reason of the shoulder on the latter.

In the accompanying drawings the invention is illustrated in its best form although it is to be understood that it is not in its broader aspects restricted to the particular detailed embodiment herewith shown and hereinafter particularly set forth.

In said drawings: Figure 1 is a side elevation of a seed planter and fertilizer distributer embodying the present improvements. Fig. 2 is a plan view thereof, and Fig. 3 is a front elevation of the same.

Similar characters of reference designate corresponding parts in the several views.

The features which are made the subject of the present application for patent are exemplified as applied to a movably mounted receptacle intended for fertilizer, and as embodied in a machine wherein fertilizer is distributed and seed is planted: but it will be understood that the novel features are capable of use for the distribution of other material than fertilizer and that it is not essential that they be embodied in a machine which also embraces means for the planting of seed. In other words, the seed planting means may be omitted without departing from the spirit of the invention, and further, if considered desirable, the retained receptacle may be employed for the distribution of other material than fertilizer.

Describing the invention with reference to the particular detailed embodiment thereof herein exemplified, 10 designates a main frame whose forward end is preferably upturned, as shown at 11, and provided with openings, through which suitable draft means 12 may be connected. This frame is supported upon one or more ground-engaging wheels 12 of any approved construction. Two wheels are shown.

Upon the frame is mounted a suitable seed receptacle 13 having any approved seeding mechanism and a chute 14 leads therefrom to the desired point in the furrow. A covering blade 15, a covering drag 16, and a furrow opener 17, all carried by the frame, provide suitable soil tilling means. Between the furrow opener 17 and the covering blade 15 there is arranged a shoe 30 which is suitably secured to the frame 10, as by a bracket 29, and has wings 31 adapted to mold the sides of the furrow to prepare it for the reception of the seed discharged from the receptacle 13. This shoe is held in operative engagement with the ground by a compression spring 34 which is secured between an arm 33 of the shoe and a bracket 32 on the frame 10, the pressure of the spring serving to force the shoe toward the ground and at the same time to allow it to be automatically elevated to clear stones or other obstructions encountered in the furrow.

21 designates the receptacle to which the novel features of the present invention are applied. This receptacle, in the present exemplification of the invention, is particularly intended for fertilizer, and it will be hereinafter referred to as a fertilizer receptacle without, however, intending thereby to restrict the invention thereto. It is pivotally connected with the upper ends of uprights 18 which are mounted upon the frame 10. The illustrated means for the connection comprise studs or pivot pins 20 which are rigidly secured to the receptacle 21 by means of brackets 22 and are mounted in bearings 19 at the upper ends of the uprights 18. The pivotal connection preferably is arranged off the center of the receptacle. This fertilizer receptacle is provided with a slide 23 by which the area of its discharge opening is regulated. This slide is adjustably held by suitable means, such, for example, as the thumb nut 24 and its bolt suitably engaged with the slide and receptacle.

A chute 25 is arranged below the discharge opening to convey the fertilizer material to the desired point in the furrow, and this chute is shown as being so disposed that it will discharge the fertilizer directly in the rear of the furrow opener 17 and in advance of the shoe 30. It is mounted adjacent to the wheels 12, and between it and the peripheral surfaces of said wheels are elements 28 which are rotatably engaged with the peripheral surfaces of the wheels and act to give jogging or vibratory motion to the receptacle whereby the material contained therein is shaken or moved toward the discharge. It is preferred to use two of such elements 28, one engaged with each wheel, but this is not essential, nor is it essential that two ground-engaging wheels be employed. It is desirable that this rotative element 28, or each of the same if more than one be employed, be of a nature adapted to produce abrupt changes in the position of the receptacle, whereby the material may be most effectively shaken or knocked therefrom, or toward the outlet thereof. It is also highly desirable, by reason of the simplicity of construction possible therefrom, so to correlate the receptacle, the ground-engaging wheel and said rotative element that the receptacle will have a support from the peripheral surface of the ground-engaging wheel, the rotative element referred to acting as an intermediary. These several desirable features are embodied in the most satisfactory form in the construction herein illustrated, but it is to be understood that this construction is merely exemplary and that its details may be varied without departing from the spirit of the invention or the scope of the subjoined claims. This construction is as follows: The receptacle 21 is mounted adjacent to the peripheral surfaces of the ground-engaging wheels 12 and its pivot points are so disposed as to induce it to move pivotally toward said peripheral surfaces. This movement is restrained and the receptacle is thereby supported in its predetermined positions by the engagement with the peripheral surfaces of the wheels 12 of the operative surfaces of pallet-shaped cams 28 which are mounted adjacent to the lower side of the rear end of the receptacle. In the illustrated embodiment two cams are employed and they are journaled upon stud shafts 27 carried by arms or brackets 26 which are rigidly secured to the fertilizer receptacle. The operative surface of each cam is formed with a shoulder $28^a$, its portion on one side of said shoulder being in a higher plane than the portion on the other side thereof and the line of demarcation between said portions being abrupt. The cams in rotating thereby raise and drop the receptacle 21 as its successive high and low portions pass between the shafts 27 and the peripheries of the wheels 12, and, as the lowest or reduced portions of the cams are arranged immediately adjacent to the widest portions thereof, said cams in rotating pass suddenly from one of its said portions to the other thereby imparting corresponding movement to the receptacle and causing a series of sharp jerks or sudden movement to be given the latter at each rotation of the cams. The receptacle 21 has its outlet arranged at its lower rear end and its bottom is inclined rearwardly to said outlet so as to induce a flow of the material toward the latter. The material is thereby most effectively discharged from the receptacle.

It will be noted that in the illustrated embodiment the cams are carried by the receptacle, the correlation of parts being such in said embodiment, that arms 26, forming simple projections from the receptacle, are adequate to serve as means connecting the cams with the receptacle when they are carried thereby. The cams are arranged out of vertical alinement with the pivots of the receptacle.

It is often desirable to allow the seeding mechanism to operate independently of the fertilizer distributer, or to allow the wheels 12 to rotate without affecting the movement of the fertilizer receptacle. The means herein shown for accomplishing this comprises a lever 35 pivoted upon one of the uprights 18 and having a cam portion 36 which engages a lug or abutment 37 carried by the fertilizer receptacle. This lever 35 is rocked by means of a link 38, which is pivoted at its forward end to the lever and extends rearwardly, passing through a loop 40 carried by one of the handle members of the machine. At its rear extremity the link 30 is bent to form a handle 39 arranged where it may be conveniently grasped by the operator. Intermediate of its ends and at a point adjacent to the loop 40 the link 38 is provided with a shoulder or offset 42 which when drawn through the loop engages the sides of the latter and prevents return movement of the link 38 and the lever 35.

When it is desired to cut off the discharge of the fertilizer, the link 38 is drawn rearwardly and rocks the lever 35. This raises the fertilizer receptacle and the cams 28 out of contact with the periphery of the wheels 12. The offset 42 prevents return of the lever 35 to its former position until it is desired to again discharge the fertilizing material, whereupon the link 38 is lifted to release the offset 42 from the loop 40, the fertilizer receptacle and the cam 48 falling by gravity into their operative positions.

While the foregoing means for causing the discharge of the material from the receptacle is especially well adapted to accomplish the several purposes of this invention, it will be understood that my invention is not restricted thereto, but is capable of many changes, variations, and modifications within the spirit of the invention and the scope of the subjoined claims.

The fertilizer distributer as already stated is herein shown as associated with a seed planter having a frame and supporting wheels, and in practice is driven directly from the wheels of the planter, but it will be fully understood that my invention contemplates also the use of the distributer independent of said planting means and further contemplates as being within its spirit the use of the receptacle as a means for distributing other than fertilizing material.

What I claim is:—

1. In a machine of the class described, a wheeled frame, a receptacle movably mounted upon the frame, and a journaled cam carried by the receptacle adapted to engage the periphery of the wheel.

2. In a machine of the class described, a frame, a wheel supporting the frame, a receptacle pivotally mounted upon the frame, and a cam journaled upon the receptacle, and adapted to engage the periphery of the wheel.

3. In a machine of the class described, a frame, a wheel supporting the frame, an upright carried by the frame, a receptacle pivotally mounted upon the upright, and a cam journaled upon the receptacle, and adapted to engage the periphery of the wheel.

4. In a machine of the class described, a frame, a wheel supporting the frame, a receptacle movably mounted upon the frame, and a pallet-shaped cam journaled upon the receptacle and adapted to engage the periphery of the wheel.

5. In a machine of the class described, a frame, a wheel supporting the frame, an upright extending upwardly from the frame, a receptacle pivotally carried by the upright, an arm carried by the receptacle, and a cam journaled upon the arm and adapted to engage the periphery of the wheel.

6. In a machine of the class described, a frame, a wheel supporting the frame, an upright carried by the frame, a receptacle pivotally mounted upon the upright, an arm carried by the receptacle, and a pallet-shaped cam journaled upon the arm and adapted to engage the wheel.

7. In a machine of the class described, a frame, a wheel supporting the frame, an upright extending upwardly from the frame, a receptacle pivotally mounted upon the frame, a cam carried by the receptacle adapted to engage the periphery of the wheel, a lever pivoted intermediate the ends of the upright, and an abutment carried by the receptacle in engagement with said lever.

8. In a machine of the class described, a frame, a wheel supporting the frame, an upright extending upwardly from the frame, a receptacle pivotally mounted upon the upright, an arm carried by the receptacle, a cam journaled upon the arm and adapted to engage the periphery of the wheel, a lever pivoted intermediate the ends of the upright, an abutment carried by the receptacle in engagement with said lever, and means convenient to the hand of the operator adapted to move the lever.

9. In a machine of the character set forth, a supporting frame having a ground-engaging wheel, a movably-mounted receptacle adjacent to the peripheral surface of said wheel, and a journaled cam interposed between the peripheral surface of the wheel and the receptacle and so correlated therewith as to impart jogging or vibratory motion to the latter from the former.

10. In a machine of the character set forth, a supporting frame having a ground-engaging wheel, a receptacle movably mounted on the frame and a journaled element which is rotatably engaged with the periphery of the wheel, said receptacle, element and wheel being so correlated that the element serves as a support for the receptacle from the wheel and said element having its surface which is engaged with the wheel formed to impart vibratory movement to the receptacle.

11. In a machine of the character set forth, a supporting frame having a ground-engaging wheel, a receptacle movably mounted on the frame and a rotative element operatively related to the receptacle and having a shouldered surface which engages the periphery of the wheel.

12. In a machine of the character set forth, a supporting frame having a ground-engaging wheel, a movably-mounted receptacle carried by the frame and tending to move toward said wheel, and a rotative element between the wheel and the receptacle, said rotative element having its operative surface engaged with the periphery of the wheel and being so correlated with the receptacle that it will be pressed against the wheel by the latter and having its operative surface adapted to impart jogging or vibratory motion to the receptacle.

13. In a machine of the character set forth, a supporting frame having a ground-engaging wheel, a receptacle pivotally connected eccentrically with the frame, and a journaled cam which is engaged with the peripheral surface of said wheel and is so connected with the receptacle as to impart jogging or vibratory movement to the latter from said surface.

14. In a machine of the character set forth, a supporting frame having a ground-engaging wheel, a receptacle pivotally connected eccentrically with the frame, and a journaled cam which is engaged with the peripheral surface of said wheel and is so connected with the receptacle as to impart jogging or vibratory movement to the latter from said surface, said cam having a shoulder and its high and low parts arranged adjacent thereto.

15. In a machine of the character set forth, a supporting frame having a ground-engaging wheel, a movably-mounted receptacle carried by the frame and tending to move toward said wheel, said receptacle having a projection, and a cam which is carried by said projection and is pressed against the periphery of the wheel by the receptacle, said cam being adapted to give vibratory or jogging movement to the receptacle from the periphery of the wheel.

16. In a machine of the character set forth, a supporting frame having a ground-engaging wheel, a movably-mounted receptacle carried by the frame and tending to move toward said wheel, said receptacle having a projection, and a cam which is carried by said projection and is pressed against the periphery of the wheel by the receptacle, said cam having its operative surface formed with a shoulder and its high and low parts arranged adjacent thereto.

17. In a machine of the character set forth, a supporting frame having a ground-engaging wheel, a receptacle which is pivotally connected eccentrically with the frame and is arranged adjacent to the wheel and has a projection, and a cam carried by said projection and pressed against the periphery of the wheel by the receptacle.

18. In a machine of the character set forth, a supporting frame having a ground-engaging wheel, a receptacle carried by the frame and arranged with its lower rear corner adjacent to the peripheral surface of the wheel, said receptacle being pivoted near its upper rear corner, and a journaled cam carried by the receptacle and arranged adjacent to the lower rear corner of the latter with its operative surface in engagement with the peripheral surface of the wheel.

19. In a machine of the character set forth, a supporting frame having a ground-engaging wheel, a receptacle pivotally mounted on the frame and arranged adjacent to the peripheral surface of the wheel, and a journaled cam so correlated with the receptacle and said surface as to be adapted to give vibratory or jogging movement to the former from the latter, said cam being disposed out of vertical line with the pivotal point of the receptacle.

20. In a machine of the character set forth, a supporting frame having a ground-engaging wheel, a receptacle pivotally mounted on the frame and arranged adjacent to the peripheral surface of the wheel, and a journaled cam so correlated with the receptacle and said surface as to be adapted to give vibratory or jogging movement to the former from the latter, said cam being disposed out of vertical line with the pivotal point of the receptacle, and having its operative surface formed with a shoulder and its high and low points adjacent to said shoulder.

21. In a machine of the character set forth, a frame having a supporting wheel, a receptacle movably mounted on the frame, means for vibrating the receptacle, including a cam journaled between said receptacle and the wheel and in engagement with the periphery of the wheel, and means for moving the same out of engagement with the wheel, comprising a lever pivoted to the frame, an abutment carried by the receptacle and in engagement with said lever, and means for rocking said lever.

22. In a machine of the character set forth, a frame having a supporting wheel, a receptacle movably mounted on the frame, means for vibrating the receptacle, including a cam journaled between said receptacle and the wheel, and in engagement with the periphery of the wheel, and means for moving the same out of engagement with the wheel, comprising a lever pivoted intermediate its ends and having a cam portion, an abutment carried by the receptacle in engagement with the cam portion of the lever, and a link connected to the lever and provided with an offset adapted to engage a portion of the frame to hold the link in one of its adjusted positions.

23. In a machine of the character set forth, a frame, a supporting wheel for said frame having a smooth periphery, a distributer, comprising a receptacle pivotally mounted upon the frame and a rotative cam actuated by the periphery of the wheel for vibrating the receptacle.

24. In a machine of the character set forth, a frame and a supporting wheel therefor, of a distributer comprising a receptacle pivotally mounted upon the frame and a rotative cam connected with the receptacle and rotated by frictional contact with the periphery of the wheel, and means for moving the cam out of contact with said wheel.

In testimony whereof I affix my signature in presence of two witnesses.

CYRIL B. CLARK.

Witnesses:
W. P. VENHOFF,
F. M. REDDING.